July 11, 1939.  E. BAUMGARTNER  2,165,201
CHANGE-SPEED GEAR, ESPECIALLY, FOR BICYCLES
Filed Oct. 11, 1937    2 Sheets-Sheet 1

E. Baumgartner
Inventor
By Glascock Downing & Seebold
Attys.

Patented July 11, 1939

2,165,201

UNITED STATES PATENT OFFICE 2,165,201

CHANGE-SPEED GEAR, ESPECIALLY FOR BICYCLES

Emile Baumgartner, Bienne, Switzerland

Application October 11, 1937, Serial No. 168,489
In Switzerland November 16, 1936

2 Claims. (Cl. 74—363)

The present invention relates to a change speed gear for bicycles.

There are already change-speed gears known where the gear ratio between crankshaft and chain wheel may be changed by back-pedaling. In this case generally for each change one pair of change wheels in constant mesh is provided, whereof one wheel is on the crankshaft and the other wheel on a countershaft. All wheels of the countershaft are integral with each other. Spring controlled pawls located in radial bores of the crankshaft are used for changing the gear ratio, said pawls being put into or out of engagement with one of the change wheels during the back-pedaling of said shaft by means of a cam shaft placed in an axial bore of the shaft.

These known mechanisms show certain disadvantages. Thus for instance in the case of three change-speed devices an immediate change from the first to the third speed is not possible. It cannot be avoided to have first thrown in the intermediate second speed. Therefore the pedals instead of being operated only once must be operated twice, forwards and backwards, to obtain the desired gear ratio. The structure of these change speeds is also such that the pawls operating the change are engaged sometimes only partly with their corresponding wheels and are working in this position until the next change. These pawls are therefore overstrained and break frequently. Also with the cam shaft, owing to the numerous cross and longitudinal bores which weaken the respective parts, occasional breakages occur.

It is the object of the present invention to avoid all such disadvantages. The arrangement according to the present invention permits a direct switching in of the desired speed by a single back-pedaling whereby one or more intermediate speeds may be jumped. The form of the pawls and their arrangement is such, that no bores of the crankshaft are needed and that the pawls come always into full engagement with their wheels.

The speed change according to the present invention is remarkable in that each of the pawls comprises a shaft provided with two dogs, each shaft being sunk into a separate groove of the crankshaft, one of said dogs cooperating with his appertaining change wheel and the other dog being in operative connection with a control disk, which, when the pedal shaft is back-pedaled, brings the respective dogs one after the other into or out of engagement with their appertaining change wheels.

The drawings show as an example one embodiment of the invention in—

Figure 1:
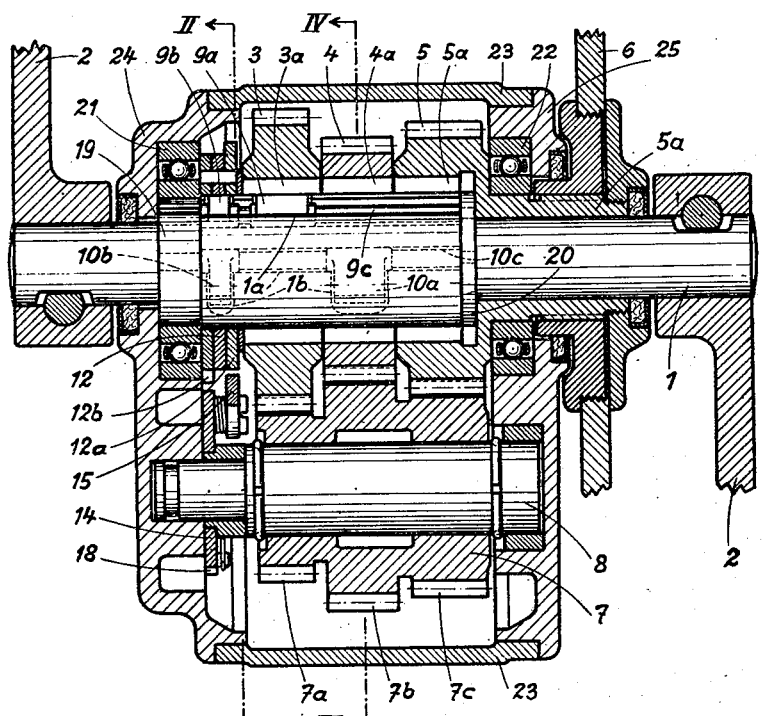

Fig. 1 by a longitudinal section, in

Figure 2:
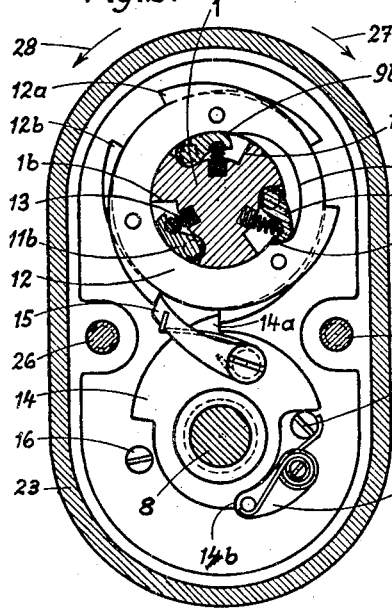

Fig. 2 by a cross section on line II—II in Fig. 1, in

Figure 3:
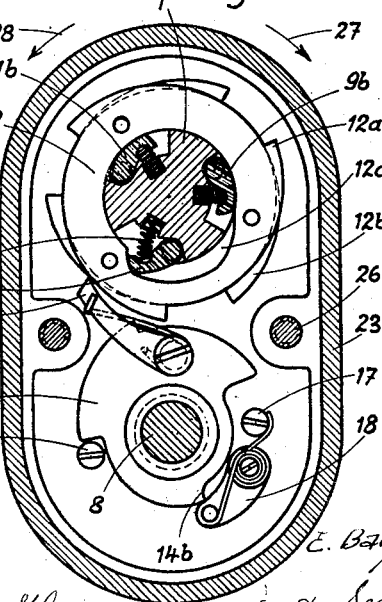
Figure 4:
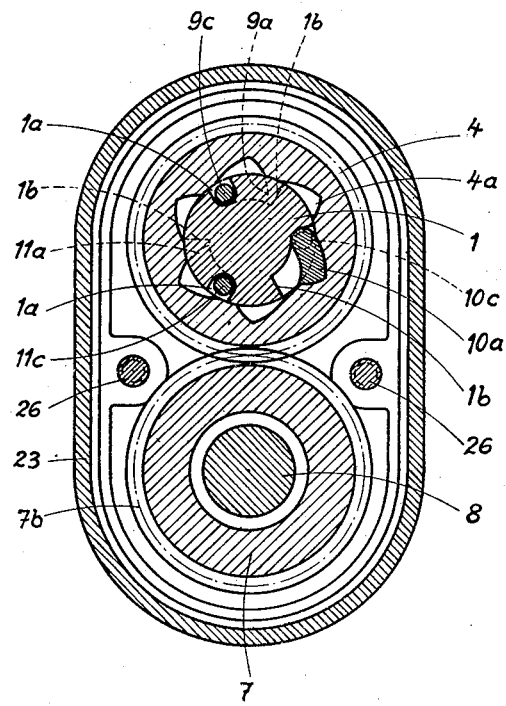

Fig. 3 by a similar cross section as Fig. 2, but with parts in another position and in Fig. 4 by a cross section on line IV—IV in Fig. 1.

The change speed shown is arranged for three speeds. 1 is the pedal shaft, 2 are the two cranks integral with said shaft and 3, 4 and 5 are three gear wheels loose on said shaft and adapted in size to the intended three speeds. These gear wheels are in constant mesh with three toothed rims 7a, 7b, 7c of an intermediate wheel 7 loose on the countershaft 8. The crankshaft 1 is journalled at one end in a ball bearing 21 and at the other end in the hub 5a of the gear wheel 5. This hub 5a is itself journalled in a ball bearing 22. Both ball bearings 21 and 22 are seated in the side walls 24, 25 of a casing completed by a shell 23 and held together by bolts 26.

Equally spaced on the circumference of the crankshaft are three carrier pawls, each formed of a shaft 9c, 10c, 11c provided each with two dogs 9a, 9b, 10a, 10b, 11a, 11b. The shafts 9c, 10c, 11c are lodged in three parallel longitudinal grooves 1a of the crankshaft and are journalled at one end in a collar 19 of the shaft and a ring 20 shrunk to the shaft. The dogs b are all in a plane perpendicular to the shaft and the dogs a are arranged each within the plane of one of the gear wheels 3, 4 and 5. Thus dog 9a is to cooperate with wheel 3, dog 10a with wheel 4 and dog 11a with wheel 5. All dogs may be sunk into recesses 1b of the crankshaft. The dogs a may by turns be engaged with or disengaged from the gear wheels 3, 4 and 5, in a manner described hereafter, to permit by these wheels and the corresponding rims of the intermediate wheel 7 an operative connection in a variable ratio between the pedal shaft and the chain wheel. The said wheels possess to this end six equally spaced notches 3a, 4a, 5a in the walls of their bores which are cooperating with the dogs a.

The dogs b are controlled by springs 13 which have the tendency to expel the dogs from their recesses 1b. A control disc 12 surrounding all the dogs is arranged rotatably on the crankshaft and possesses a curved recess 12c on its inner rim which at one end tapers into said inner rim and at the other end forms a shoulder 12d. The cut out 12c permits the dogs b to be expelled from their recesses. These recesses are of such a form and size that they permit only one dog 10b at a time to be raised by its spring 13 from the respective cavity in the crankshaft into an elevated position and this only in the case when at the same time the corresponding dog 10a is free to be raised into engagement with one of the notches 4a.

Said disk 12 is made of three plates pinned together, to wit, two outer plates 12a and 12b having ratchet teeth on their outer rim set in opposite direction and a center plate 12. Cooperating with these ratchet teeth is a stop plate 14 rotatably held on the countershaft and provided on its half of a larger diameter with a tooth 14a, while with its recessed half of smaller diameter it is located between two diametrically arranged stop pins 16, 17, which permit for disk 14 only a small pivoting movement large enough to throw tooth 14a alternatingly in and out of gear with the ratchet teeth of control disk 12b.

Stop plate 14 carries also a spring-controlled pawl 15 which becomes engaged with the ratchet teeth of control disk 12a when crankshaft is back pedaled in the direction of the arrow 28 as shown in Fig. 2, while in Fig. 3 tooth 14a and pawl 15 are shown out of engagement during the forward pedaling in the direction of arrow 27. During this forward pedaling, the stop plate 14 is stopped by pin 16 and the pawl 15 ratchets over the teeth 12a and 12b. Stop plate 14 shows besides on its smaller half a circular recess 14b against which bears a spring-controlled arm 18. This arm locks stop plate 14 and with it also control disk 12 in the speed-change position of Fig. 2 and the pressure of the spring-controlled arm 18 must be overcome to resume again the forward movement of the crankshaft.

The change-speed gear is operated as follows:

We will suppose that the carrier pawl corresponding to gear wheel 4 be effective, that is that dog 10a be engaged into one of the notches 4a in the gear wheel 4. Then dog 10b and disk 12 take the relative position as shown in Fig. 3, and also the parts 14 and 15. It is desired to change the gear ratio into the next following step.

For this purpose the crankshaft must be back-pedaled for a quarter turn in an anti-clockwise direction as shown by arrow 28. Then control disc 12 will be taken along by friction will contact by tooth 12a with pawl 15 and turn the stop plate 14 into the position of Fig. 2. The control disk is thereby stopped, but the shaft I continues turning therefore the dog 10b projecting into the cut out 12c will leave this recess and be pressed back into its recess 1b together with the corresponding dog 10a which is also sunk into its recess 1b of the crankshaft and is disengaged therefore from gear wheel 4. Now by the continued back-pedaling dog 11b will take the place of dog 10b and come to face the recess 12c and will be expelled by its spring 13 from its recess 1b of the crankshaft, when the cooperating dog 11a can drop into a recess 5a of the gear wheel 5. If this dog does not face said recess, dog 11b remains sunk within its recess 1b.

The crankshaft is now turned again in a clockwise direction (arrow 27) and then the control disk 12 will be prevented from turning likewise by the tooth 14a, because arm 18 has been engaged by the notch 14b of stop plate 14. As soon as dog 11b bears against the shoulder 12d the stop plate 14 is brought back against the effect of arm 18 into its first position shown in Fig. 3. The spacing of the notches 3a, 4a, 5a of the wheels carried by the crankshaft amounts to about half the length of the arc of recess 12c so that in the above mentioned case, where after the change the succeeding dog a could not engage one of the recesses 3a, 4a, 5a, this engaging becomes possible during the clockwise rotation of the crankshaft.

If at the end of the back pedaling the control disk 12 advances in such a position with respect to the dogs b, in which the dog facing the recess 12c is kept sunk within its recess by the portion of the cut out dying out into the bore, this dog will be brought into engagement with the shoulder 12d owing to the stopping of the control disk by the stop plate, when the shaft is again pedaled in a clockwise direction. In this position a complete engagement of said dog a is always possible. Thus care has been taken that in no case a dog be engaged only partly or not at all.

If it is desired to jump one step it suffices as may be seen from the drawings to back pedal the shaft for two-thirds revolution instead of only one-third revolution. Then the operations as described will take place with the difference that the dog b which corresponds to the jumped step will pass the recess 12c so that it projects into said cut out only for a short time and will immediately afterwards be disengaged again and sunk into its recess of the crankshaft. Only the following dog b will be engaged with the shoulder 12d by a stopping of the shaft.

It is evident that according to the described structure change-speed gears with two or with more than three steps could be built. Also the parts could be formed otherwise than shown by the drawings without leaving the scope of the present invention.

What I claim is:

1. Change-speed gear for bicycles of the constant mesh toothed wheel type in which the speed change is obtained by back pedalling and in combination, a casing adapted to be pressed into the framing, a pedal shaft and a countershaft, the first rotatably held within the casing, three change-speed pinions loose on the pedal shaft and having notched bores, one of said pinions in operative connection with the chain wheel; a change wheel sleeve loose on the countershaft and in constant mesh with said change speed pinions, a control disk formed in part by two coupled coadjacent disks having oppositely directed ratchet teeth and provided with a limited recess in its bore, three small shafts sunk into longitudinal grooves of the crankshaft, each small shaft carrying two dogs, the one, spring controlled, adapted to cooperate with said recess in the bore of the control disk and the other adapted to cooperate with the notches of one of the respective change-speed pinions, a toothed stop plate pivotally held on said countershaft, a spring-controlled plate carried by this stop plate which stop plate and pawl is arranged to cooperate with the teeth of the control disk, and diametrically arranged stop pins fast to the casing adapted to limit the pivoting of said stop plate and to cause the engagement of one of the dogs with a notch of a respective change-speed pinion.

2. In a change-speed gear according to claim 1, the combination with a locking device to lock said control disk in a respective change speed position, said device comprising a circular recess in the rim of the stop plate and a spring-controlled arm hinged to the casing and adapted to be engaged in said recess.

EMILE BAUMGARTNER.